Figure 1:
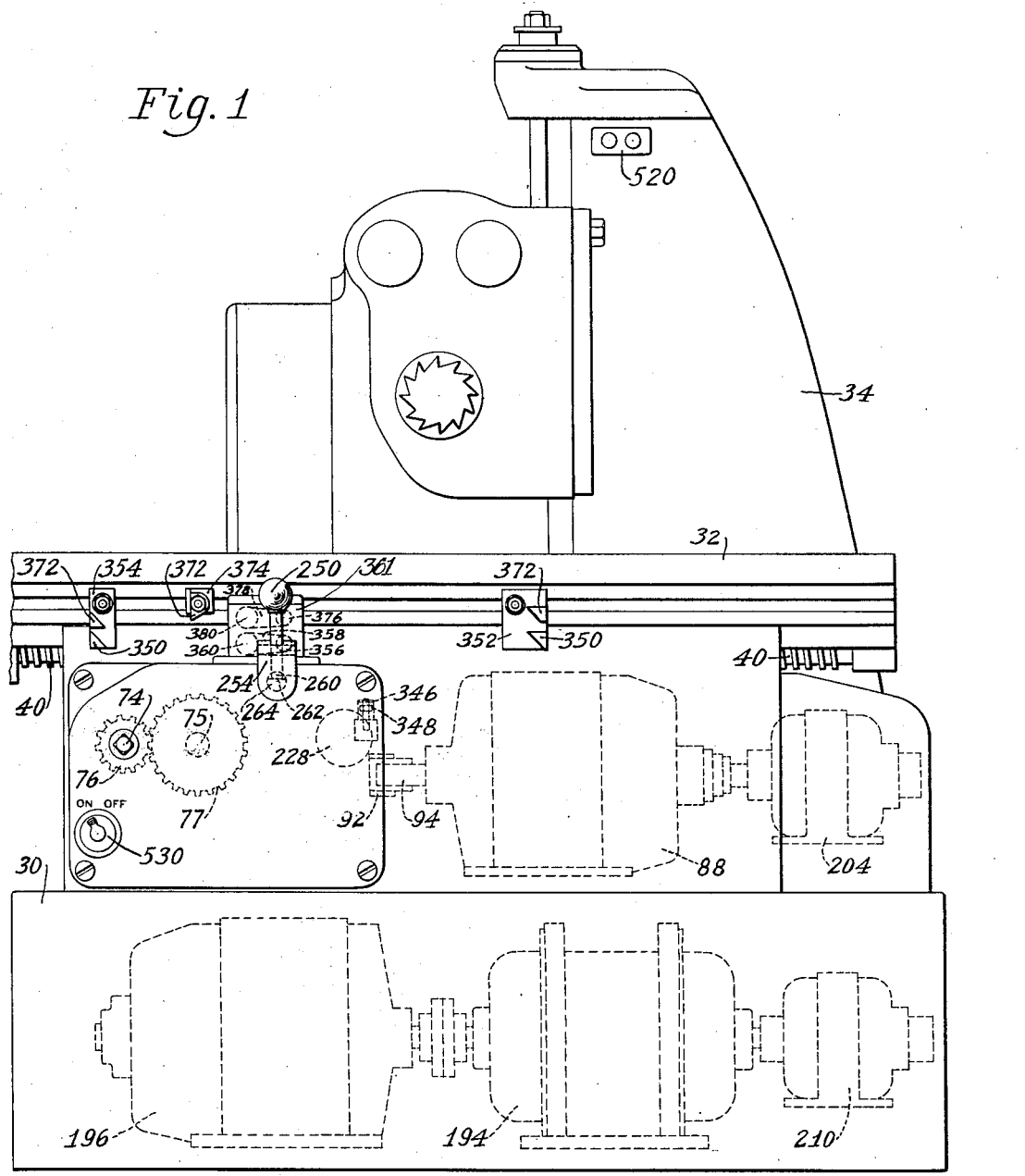

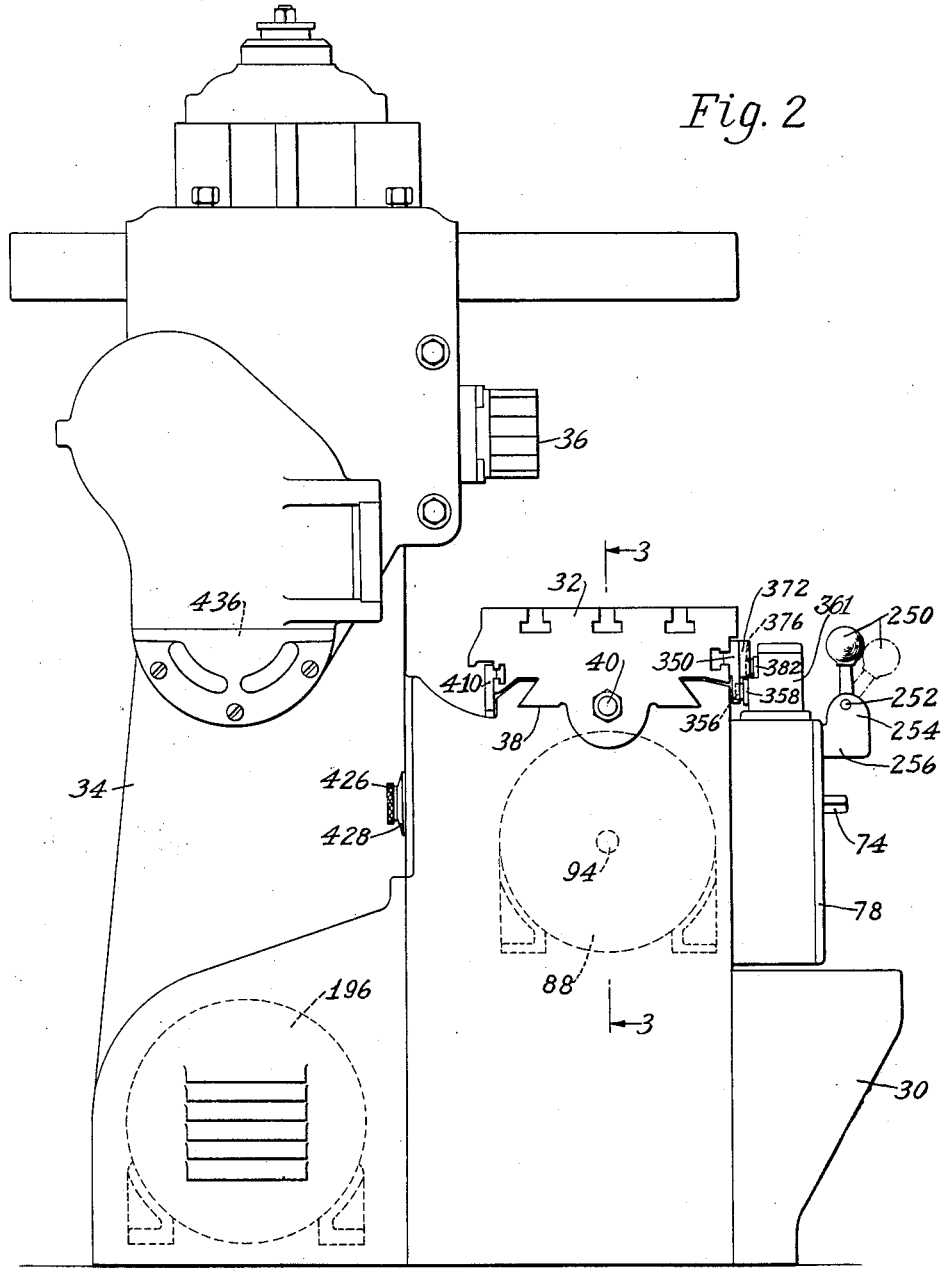

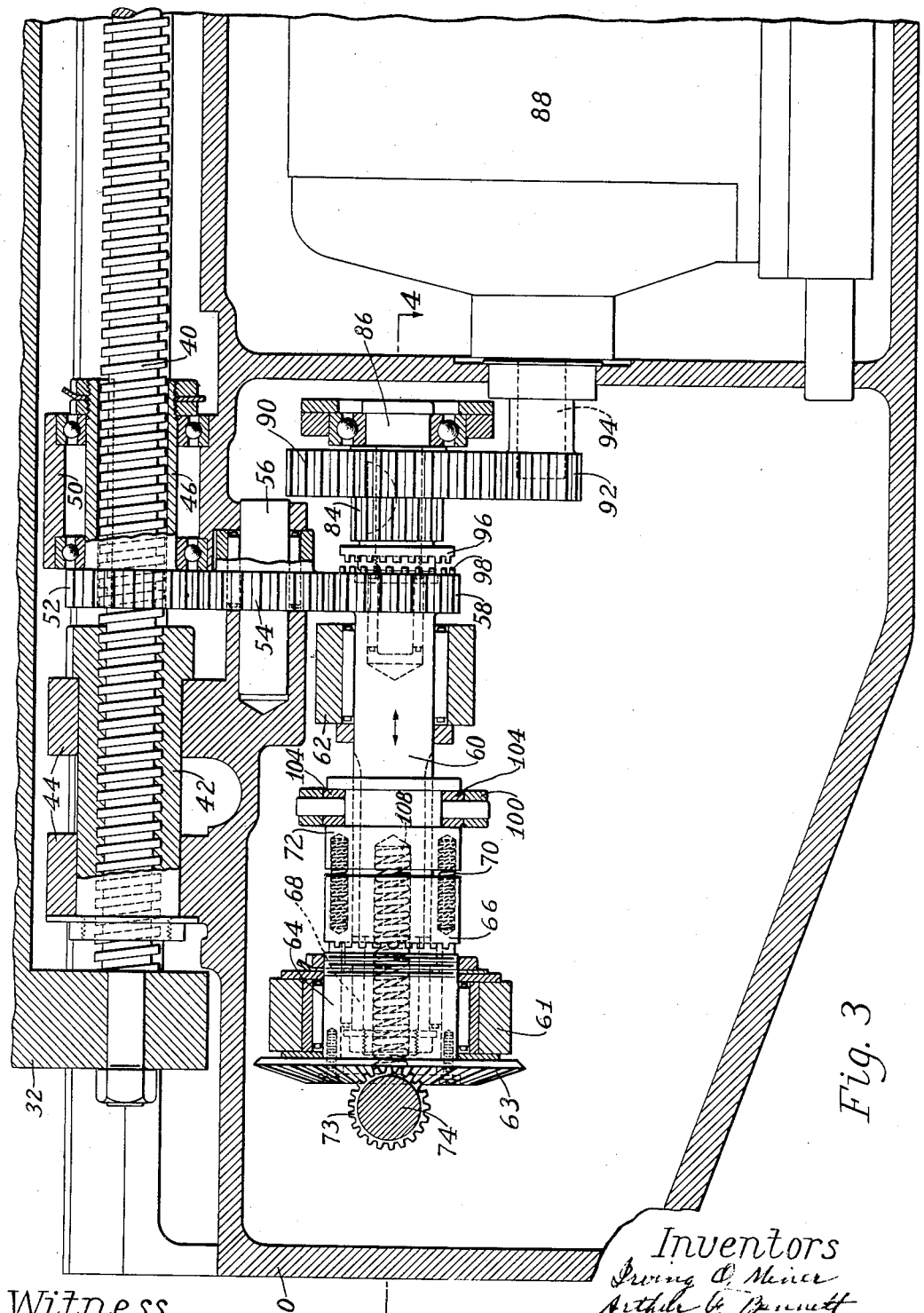

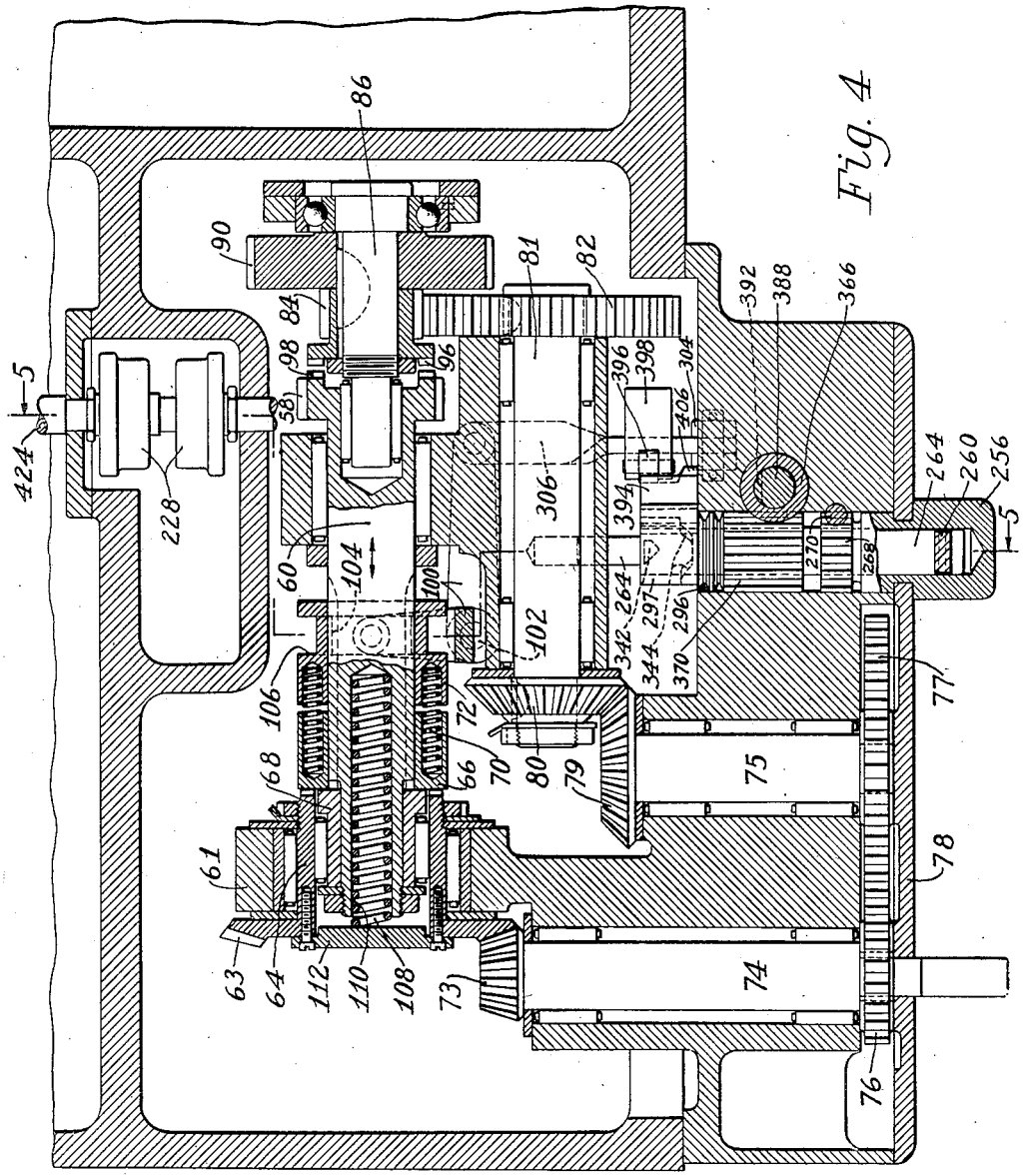

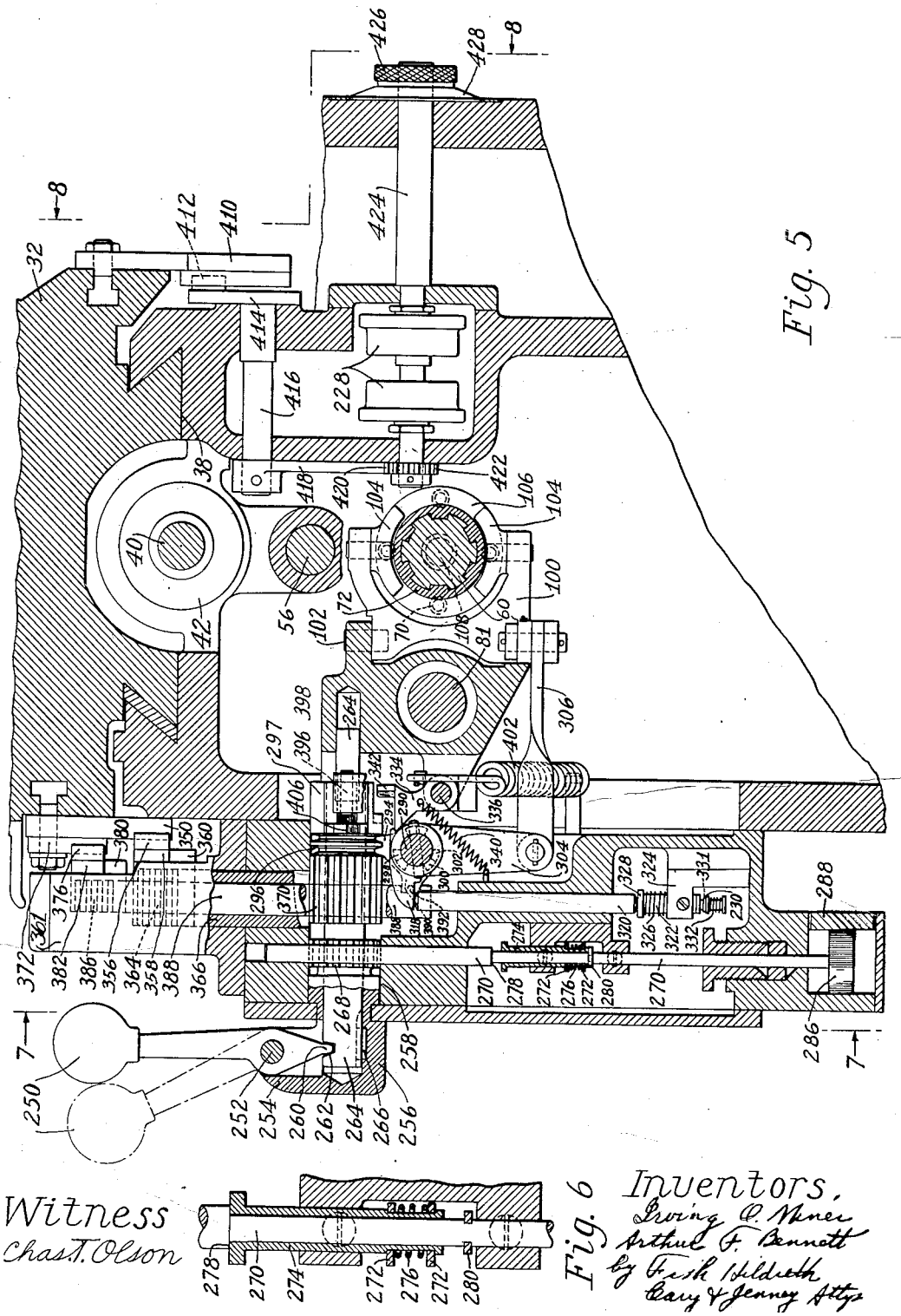

Aug. 13, 1935.  I. O. MINER ET AL  2,011,068

MACHINE TOOL

Filed April 18, 1933  12 Sheets-Sheet 6

Witness
Chas. T. Olson

Inventors
Irving O. Miner
Arthur P. Bennett
by Fish, Hildreth,
Cary & Jenney Attys.

Aug. 13, 1935.  I. O. MINER ET AL  2,011,068
MACHINE TOOL
Filed April 18, 1933    12 Sheets-Sheet 7
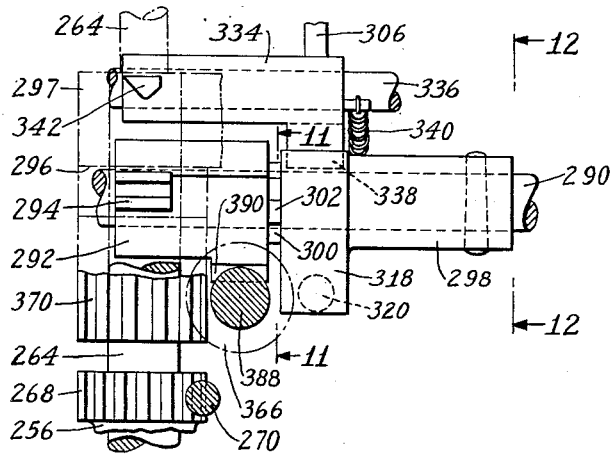
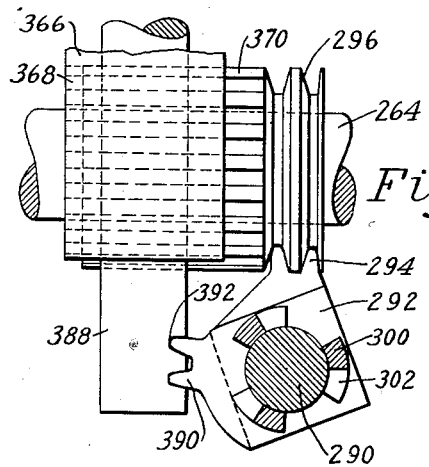
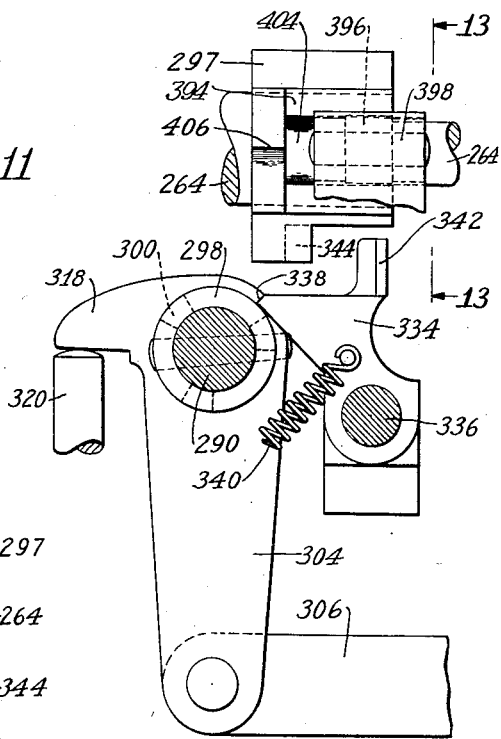
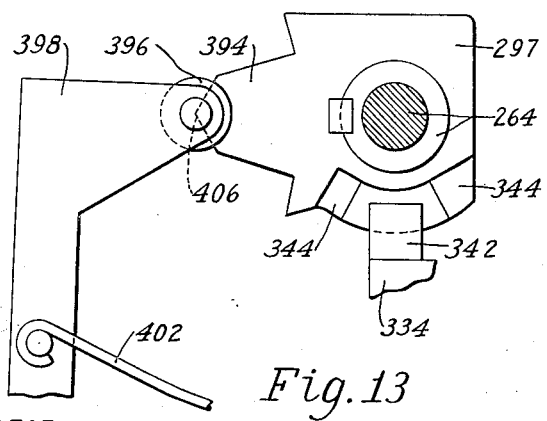
Witness
Chas. T. Olson
Inventors
Irving O. Miner
Arthur G. Bennett
by Cary & Jenney Attys.

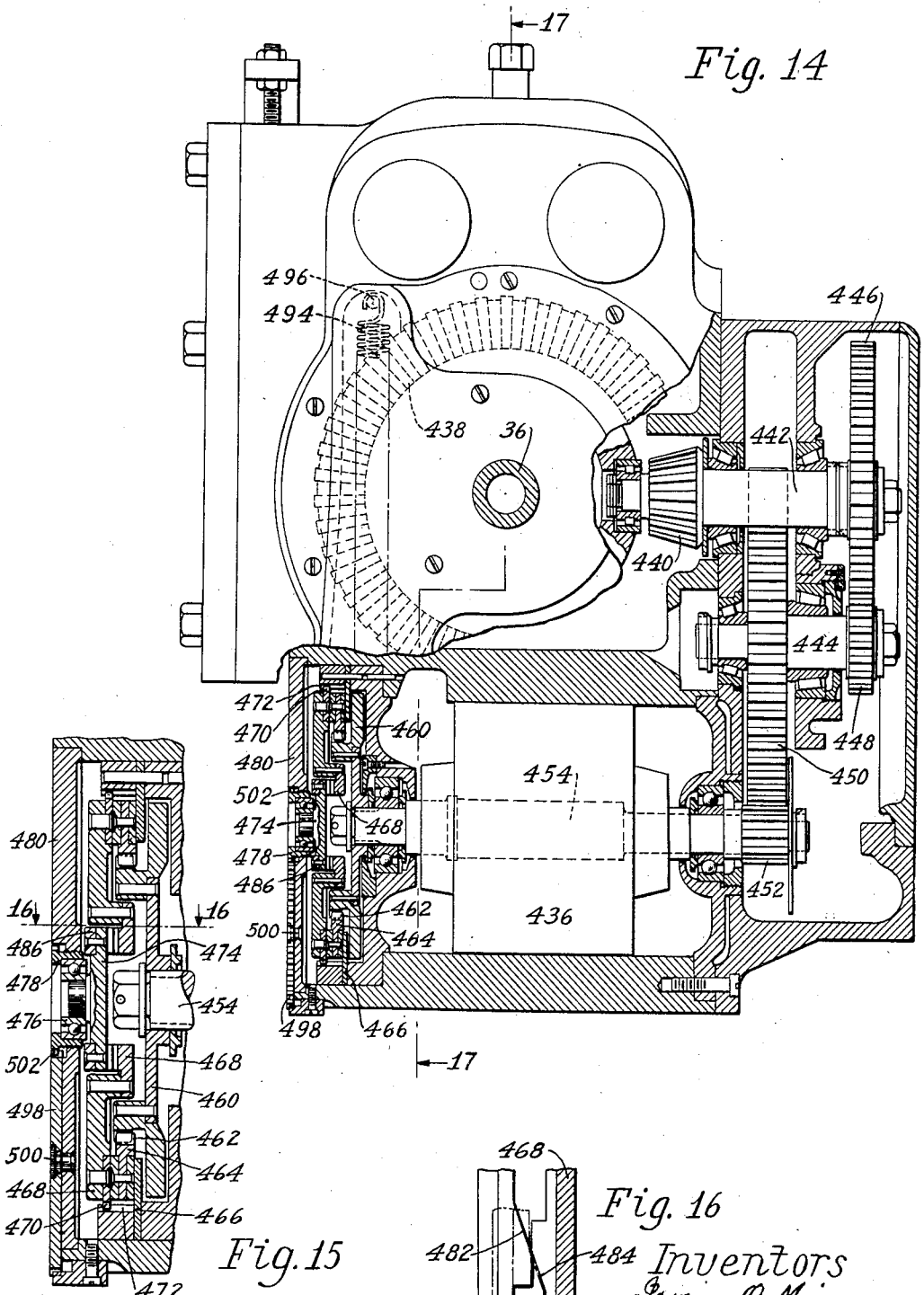

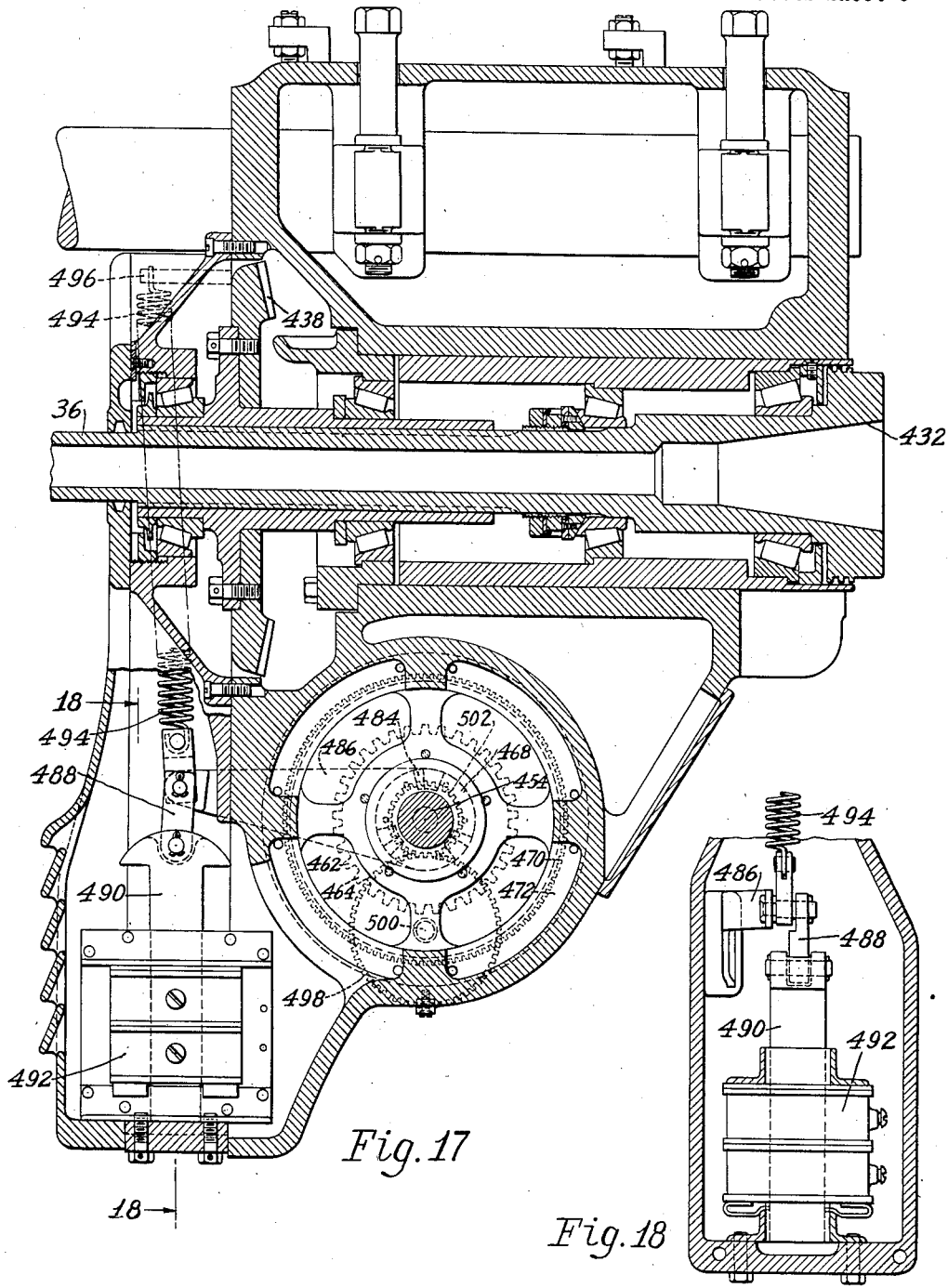

Aug. 13, 1935.  I. O. MINER ET AL  2,011,068
MACHINE TOOL
Filed April 18, 1933   12 Sheets-Sheet 10
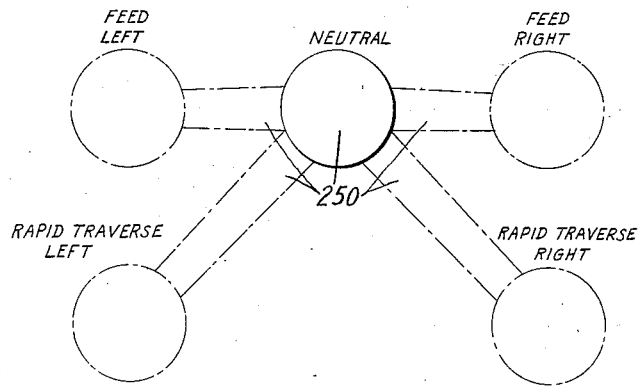
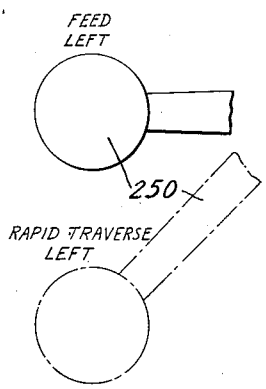
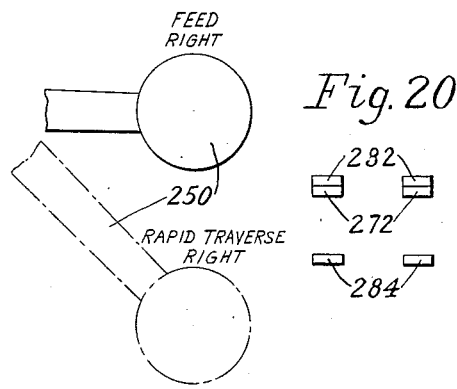
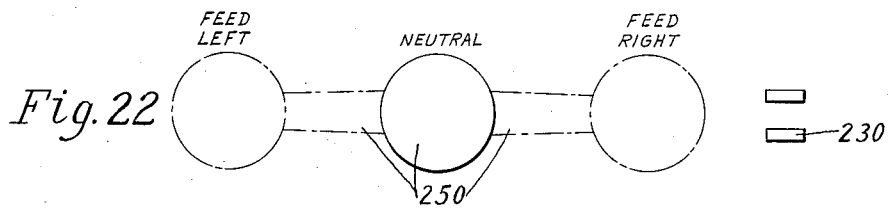
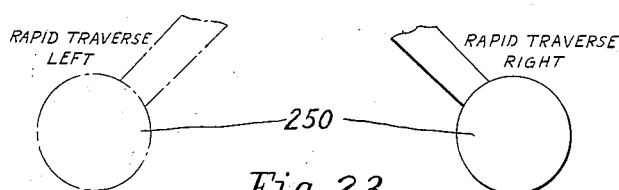

Patented Aug. 13, 1935

2,011,068

UNITED STATES PATENT OFFICE 2,011,068

MACHINE TOOL

Irving O. Miner, Seekonk, Mass., and Arthur F. Bennett, West Barrington, R. I., assignors to Brown and Sharpe Manufacturing Company, a corporation of Rhode Island Application April 18, 1933, Serial No. 666,704

40 Claims. (Cl. 90—21)

The present invention relates to improvements in machine tools, and more particularly to milling machines of the general type in which relative feeding movements are imparted to a rotating milling cutter and a work support.

It is a principal object of the invention to provide a simplified and improved milling machine in which the required relative movements can be imparted to the work and tool without the use of the complicated gear trains, clutches and other control devices usually found in this type of machine.

Other objects of the invention are to improve the construction and operation of milling machines of this general type to secure a greater degree of smoothness and certainty of operation than has heretofore been attained.

It is a distinguishing characteristic of a milling machine as compared, for instance, to a planer type of machine tool, that the cutting operation is performed by means of a rapidly rotating milling cutter which advances progressively into the work, removing successively a series of small chips to the depth required, so that the entire operation is completed during a single traverse of the rotating cutter through the work. Inasmuch as the thickness of the chips removed is determined by the relative rate of feed of the cutter and work, and a slight increase in this feeding rate tends very rapidly to increase the load on the cutter, a very close adjustment of this feeding rate is required to secure a maximum efficiency of the machine. In order to cope with the wide variety of operating conditions encountered in actual operation, taking into account the character and hardness of the material operated upon and the shape of cut, it is common practice in these machines to provide variable speed gear train drives capable of providing a wide range of feeding rates which may vary in a ratio of 1 to 50 or more to enable the operator to set up the machine for most efficient operation under all conditions which are likely to be met. A principal feature of the present invention consists in the provision of a variable speed motor drive for the work supporting table which will eliminate the complicated change speed and reversing gear connections ordinarily employed, and may be readily controlled to provide an even continuous feed of the table at any one of a number of feeding rates measured conveniently in inches per minute over the entire range required.

Other features of the invention relate to the provision of a simple and efficient system of control mechanisms for coordinating the mechanical and electrical operating devices for controlling the operation of the machine.

Figure 7:
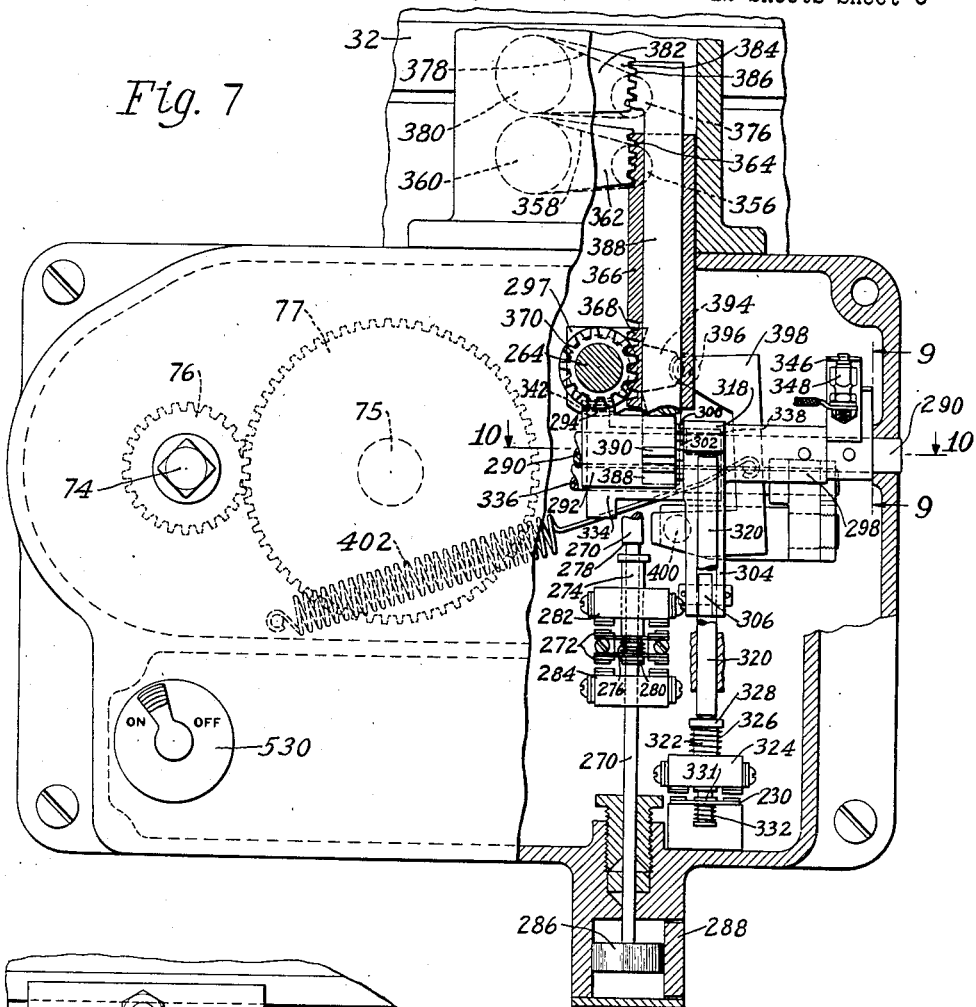
Figure 8:
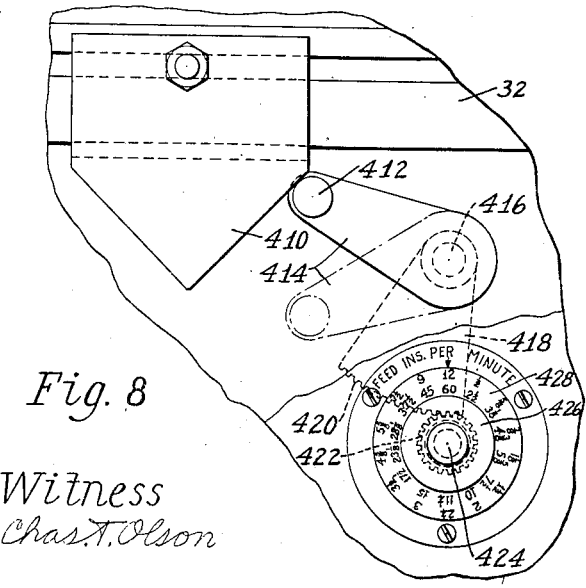
Figure 9:
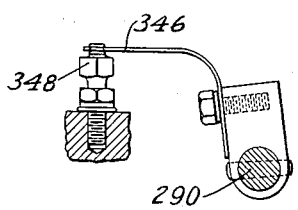
Figure 24:
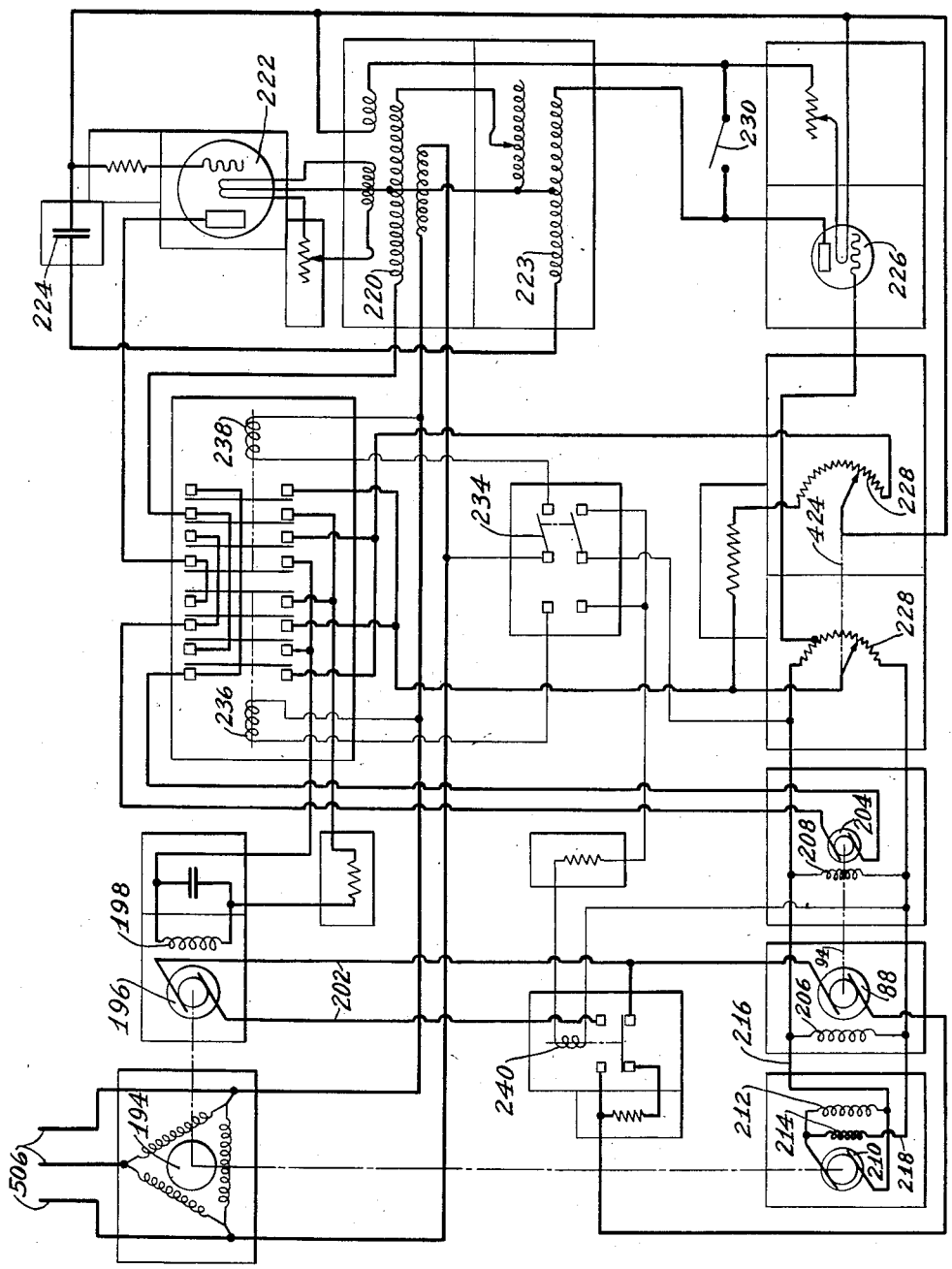
Figure 25:
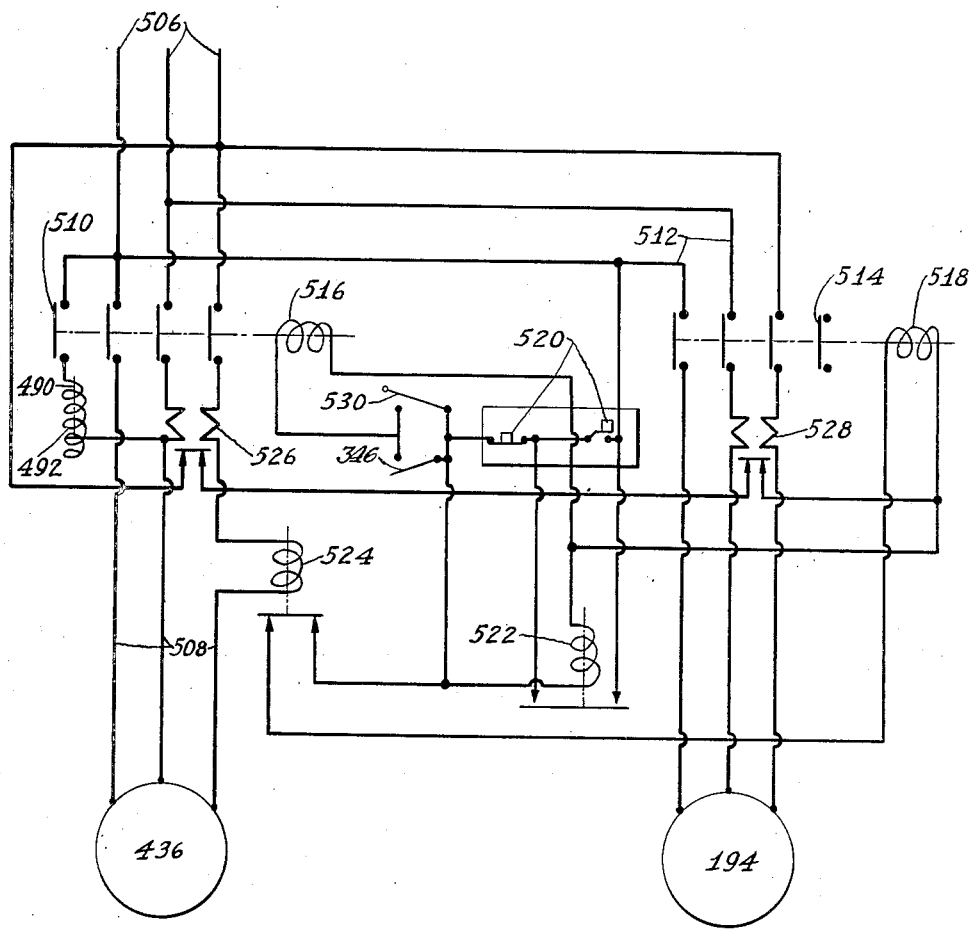

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of a milling machine embodying the several features of the invention; Fig. 2 is a view in left side elevation of the machine illustrated in Fig. 1; Fig. 3 is a detail sectional view of the table drive taken on the line 3—3 of Fig. 2; Fig. 4 is a sectional plan view taken on the line 4—4 of Fig. 3 to illustrate particularly the low speed table drive; Fig. 5 is a sectional view in right side elevation taken on the line 5—5 of Fig. 4; Fig. 6 is a detail view on an enlarged scale of the reversing switch shown in Fig. 5; Fig. 7 is a front view with a portion of the casing broken away to show particularly the control mechanism for the table drive illustrated in Fig. 5; Fig. 8 is a detail view taken from the rear of the machine as indicated by the line 8—8 of Fig. 5, and illustrating particularly the dogs and intervening mechanism for controlling the motor speed; Fig. 9 is a detail view of the cutter spindle starting and stopping switch taken on the line 9—9 of Fig. 7; Fig. 10 is a detail plan view of a portion of the control mechanism for the table drive; Fig. 11 is a view taken substantially on the line 11—11 of Fig. 10; Fig. 12 is a detail view in right side elevation of substantially the parts shown in Fig. 10 to illustrate particularly the latch release mechanism for the quick traverse table drive; Fig. 13 is a view taken substantially on the line 13—13 of Fig. 12 looking from the rear of the machine to illustrate the detent mechanism for positioning the table controls alternatively in neutral or in driving positions; Fig. 14 is a view in front elevation with a portion of the casing broken away and partly in section of the spindle supporting head, the spindle actuating motor, and the driving connections therefrom to the spindle; Fig. 15 is a detail sectional view on an enlarged scale of the brake mechanism shown in Fig. 14; Fig. 16 is a detail view partly in section taken on the line 16—16 of Fig. 15 illustrating particularly cooperating cam surfaces for setting the spindle motor brake; Fig. 17 is a sectional view taken on the line 17—17 of Fig. 14; Fig. 18 is a detail view partly in section taken substantially on the line 18—18 of Fig. 17 to illustrate particularly the solenoid and other actuating connections for the spindle motor brake; Figs. 19 to 23 inclusive are somewhat diagrammatic views showing the several positions of the single manual control member for the variable speed drive and the corresponding positions of the switch contacts, Fig. 19 showing the feed control switch in an intermediate or neutral position, Figs. 20 and 21 illustrating the alternative slow feed driving positions of the control member and the corresponding positions of the switch contacts, Fig. 22 illustrating the open or neutral position of the quick traverse switch, and Fig. 23 illustrating the alternative quick traverse operating positions of the control member and the corresponding position of the contacts of the quick traverse switch; Fig. 24 is a diagram of the electrical connections for the variable speed table drive embodying certain features of the present invention; and Fig. 25 is a diagram of the electrical connections to the spindle motor and the main driving motor for the table drive.

The machine disclosed as embodying, in a preferred form, the several features of the present invention, comprises a horizontally movable work table and a rotary cutter spindle supported for vertical adjustment on the machine column above the table. An electric motor drive is provided for the table operating through a clutch mechanism which is arranged to drive the table through a reduction gearing at a slow feed rate, or directly at a quick traverse rate. In order to secure the wide range of table feeding rates required in operating on different types of work, a variable speed motor control is provided to enable the speed of the motor to be varied within wide limits, so that the required changes of speed may be obtained without the necessity of a complicated set of change speed gears and clutches with the attendant power losses in transmission. The motor control herein disclosed is adapted to produce variations in the motor speed over a range having a ratio of substantially 1 to 25, and is further arranged to regulate the motor speed in accordance with the corresponding setting of the controls to maintain a constant feeding rate of the table regardless of variations in load. Reversal in the direction of feed of the table is accomplished by means of a reversing switch and suitable connections which operate to reverse the motor and determine the limits of table travel in each direction with a precision approximating a few thousandths of an inch. It has been found that a single set of two reversible pick-off gears acting in conjunction with the variable speed motor control herein provided, enables the wide range of feeds to be obtained necessary for commercial use. A separate motor is provided for driving the spindle at a constant rate.

The variable speed motor drive comprises a separately excited direct current motor, a driving generator, means for supplying rectified current impulses to the generator field windings, control devices therefor to arbitrarily vary the supply of field current to the driving generator to adjust the speed of the motor, and additional control devices therefor to cause the motor to maintain a constant rate of rotation under varying loads at any speed for which it has been adjusted. The slow traverse feeding rate of the table is determined by the setting of a potentiometer for controlling the motor speed, and also by transposing a set of change gears located in the slow traverse feed train. A reversing switch is provided to reverse the direction of motor drive at the end of the movement of the table in either direction. For driving the table at the quick traverse rate there is also provided a high speed switch which is connected to operate only when the clutch is thrown into quick traverse position, and operates to drive the motor at a maximum speed regardless of the setting of the potentiometer.

Adjustments in the slow traverse feeding rate of the table in either direction can be made during the operation by changing the setting of the potentiometer manually or automatically by means of dogs which are adjustably located on the table in the path of relatively stationary actuating lever arms. For the convenience of the operator in manually controlling the operation of the machine, a single operating lever is provided which is movable in either direction lengthwise of the table travel from a neutral position to drive the table in opposite directions at either a slow feed rate or a quick traverse rate, and is movable at right angles thereto to shift from one of said rates to the other. These adjustments may also be effected automatically at any predetermined point in the travel of the table in either direction by means of dogs mounted on the table.

Another feature of the invention contemplates provision of a novel and improved electrically operated mechanism for quickly and efficiently stopping the rotation of the cutter spindle to prevent unnecessary scoring or injury to the work as the table and work are moved to a new operating position with relation to the cutter spindle at a quick traverse rate.

Referring more specifically to the drawings, the milling machine disclosed comprises a machine base 30 on which a work supporting table 32 is mounted to slide, a machine column 34, a vertically adjustable support 35 on the column, and a horizontal rotary spindle 36 mounted on the support. The table 32 is mounted to slide on ways 38 on the base 30, and is driven through mechanism (see Fig. 3) comprising a feed screw 40, which is rotatably mounted at each end in bearings on the work table 32. The feed screw is screw-threaded through a stationary nut 42 which is supported against endwise movement in the two arms of a bracket 44 forming an integral part of the base 30, and is rotated to impart the required feeding movements to the table by means of a sleeve 46 keyed to turn therewith and externally supported in a ball bearing support 50 fixedly mounted on the base 30. The sleeve 46 is positively driven to rotate the feed screw 40 and impart the required feeding movements to the work by the engagement of a gear 52 secured to one end of the sleeve with an idler gear 54 which is secured to a short pivot shaft 56 in the base, and which also meshes with a pinion 58 formed on a shaft 60 mounted for rotary and lengthwise movements in bearings 61 and 62 on the machine frame.

The table is driven at a slow feed rate through a reducing gear train which is connected by means of a clutch to drive the shaft 60. These connections (see Figs. 3 and 4) comprise a bevel gear 63 formed on a sleeve member 64 which is mounted concentrically with the shaft 60 in the fixed bearing 61. The bevel gear 63 may be connected to drive the shaft through the engagement of corresponding jaw clutch surfaces formed respectively on one end of the sleeve 64 and on a clutch sleeve member 66 keyed to turn with the shaft 60. The clutch sleeve member 66 is held yieldingly against the end of a sleeve 68, secured to the shaft 60, by means of compression springs 70 seated in recesses in the clutch sleeve 66 and in corresponding recesses in a sleeve member 72 rigidly secured to the shaft 60. The bevel gear 63 meshes with a correspondingly beveled pinion 73 which is secured to one end of a horizontal shaft 74. At its forward end the shaft 74 is connected to a parallel drive shaft 75 by means of two interchangeable take-off gears 76 and 77. These gears may be readily exchanged or replaced by the operator upon removal of the front plate 78 from the machine. To permit hand operation of the table, the shaft 74 extends forwardly through the plate 78, and is provided with a squared end to receive a manually operable crank handle. The shaft 75 is provided at its rear end with a bevel gear 79 which meshes with a corresponding gear 80 on one end of a laterally extending shaft 81. A gear 82 on the shaft 81 meshes with a gear 84 splined to a shaft 86 concentric with the shaft 60, but normally disconnected to move independently thereof. The shaft 86 is driven from a variable speed direct current motor 88 by means of a gear 90 on the shaft 86 which meshes with a pinion 92 secured to the armature shaft 94 of the motor 88.

For driving the table at a quick traverse rate, connections are provided for driving the shaft 60 from the motor independently of the slow feed reduction gear train above described. To this end a clutch member 96 is formed on the shaft 86, and is arranged to engage with a corresponding clutch face 98 on the endwise movable drive shaft 60 upon movement of the shaft to the right, as shown in Fig. 4. The movement of the shaft 60 in either direction to engage alternatively the slow speed and quick traverse drives, is controlled through connections which comprise a bell-crank clutch lever 100 pivotally mounted at 102 on the machine frame. A yoke formed on one arm of the bell-crank 100 has pivotally secured thereto, two shoes 104 which engage in a groove 106 in the sleeve member 72 secured to the shaft 60. The shaft 60 is moved yieldingly to the right to engage the quick traverse clutch members 96 and 98 by means of a heavy compression spring 108 which is mounted in a recess 110 formed axially of the shaft 60, and is arranged to bear against a cover plate 112 secured to the bevel gear 63 and supporting sleeve 64. The movement of the bell-crank clutch lever 100 is controlled to engage alternatively the slow speed or quick traverse drive through connections hereinafter more fully to be described.

The variable speed direct current motor 88 and the electrical connections which permit the motor to be operated at any desired speed, and which act automatically to regulate the motor to a substantially constant speed at any setting regardless of changes in load, are similar in many respects to those illustrated and described in the copending application of Irving O. Miner, Serial No. 613,203, filed May 24, 1932. Referring to Fig. 24, the driving motor 194, illustrated as a three phase induction motor, is directly connected to the armature of a direct current generator 196 which has a separately excited field 198. The generator 196 is electrically connected by wires 202 to the armature of the variable speed direct current motor 88 which is the main driving motor for the work supporting table. The motor 88 drives a small direct current pilot generator 204, the voltage of which is directly dependent upon the speed of the motor. The motor 88 and the pilot generator 204 have separately excited fields 206 and 208 respectively which are energized by a constant voltage compound generator 210 driven at constant speed by the induction motor 194. The generator 210 has a shunt field 212 and a series field 214, and is connected to energize the fields 206 and 208 by wires 216 and 218.

The speed of the main driving motor 88 is controlled by varying the field current through the field winding 198 of the direct current generator 196. The field current is supplied to the winding 198 as rectified impulses from the secondary 220 of a transformer through an arc discharge tube 222 preferably of the thyratron type. As shown in the drawings, the field winding is connected between one end of the secondary 220 and the plate of the thyratron tube. The filament of the tube which is energized in a suitable manner, is connected to the mid points of the transformer secondaries 220 and 223. The grid potential of the tube is controlled by a variable impedance phase-shifting circuit whereby regulated amounts of energy may be delivered from the transformer through the plate circuit to the field. The phase-shifting circuit comprises a condenser 224 connected between one end of the transformer secondary 223 and the grid, and a variable resistance connected between the other end of the transformer and the grid. For convenience of control, the variable resistance preferably comprises the plate circuit of a three element thermionic tube 226. Variations in resistance are occasioned by variations in the grid potential of the tube 226. By this arrangement impulses of substantially constant magnitude but of varying phase are impressed on the grid of the thyratron, and this action serves to initiate the arc discharge at a variable point in each cycle, the variation in the average energy delivered to the field being therefore dependent upon the magnitude of the resistance included in the plate circuit of the tube 226.

With the thyratron connections as illustrated, a decrease in the plate resistance of the tube 226 (effected by an increase in the grid potential) results in an increase of current delivered to the generator field 198. Conversely, an increase in plate resistance effected by decrease in grid potential results in a diminution of current delivered to the generator field 198.

Variations in grid potential of the tube 226 and consequently variations in the amount of current delivered to the field 198 are effected by a dual control dependent upon a manually controlled voltage and a superposed speed-control voltage generated by the pilot generator 204. The positive lead 218 which leads from the constant voltage generator 210 connects with the grid of the tube 226. A potentiometer 228 is connected between the leads 216 and 218, and serves to provide an arbitrary control of the potential impressed on the grid by the pilot generator 204 to vary the speed of the driving motor. The setting of this potentiometer may be controlled automatically during the operation of the machine, or manually to secure the required rate of feed of the table in terms of inches per minute.

Under certain operating conditions and more particularly in connection with the operation of the work table at a quick traverse rate, it is desirable to accelerate the motor 88 to a maximum speed without, however, interfering with the setting of the potentiometer to drive the motor at the desired feed rate after the work has been brought into operative position with relation to the cutter. To this end an automatic switch 230 is provided which acts when closed to short circuit the resistance comprised by the plate circuit of the thermionic tube 226, and so to regulate the arc discharge tube 222 for a maximum speed of the motor 88. As hereinafter more fully described, the switch 230 is automatically closed upon movement of the machine controls to quick traverse position, and is then opened upon return of the controls to slow feeding position to reestablish the controlled resistance of the tube 226, so that the motor 88 will be immediately slowed down to the desired feeding rate as determined by the setting of the potentiometer 228.

The electrical motor control illustrated in the diagram (Fig. 24) also embodies a reversing switch 234 and electrical connections including reversing relays 236 and 238 which are adapted to permit a reversal of the motor without damage to any of the apparatus, and is further arranged to regulate the motor to the same speed for identical settings of the potentiometer regardless of the direction of drive. In order to prevent injury to the motor upon reversal, a dynamic brake apparatus is employed comprising the relay 240 which operates during the interval of time required for the throwing of the reversing switch 234 to short-circuit the motor armature, and thus to bring the motor quickly to rest. The electrical connections controlled by the reversing relays 236 and 238 reverse the direction of current supplied to the generator field 198 to reverse the generator voltage and the direction of rotation of the motor 88. Likewise, the connections of the pilot generator 204 are reversed by the relays 236 and 238, so that the potentials in the grid circuit are unchanged in direction, and thus operate to secure the same regulation of the motor for either direction of drive.

The electrical motor control above described is particularly valuable in connection with the operation of a reciprocating support such as that herein disclosed, in that it is possible to stop and reverse the direction of the motor drive almost instantaneously without injury to the electrical connections, so that the length of movement of the table in either direction may be determined automatically with extreme accuracy in accordance with the requirements of the work. That this result may be attained without injury to the electrical apparatus is due primarily to the inertia of the plate circuit of the thyratron set up by the inductance of the generator field circuit. Thus the generator field current is caused to build up slowly without damage to the thyratron, and likewise the voltage of the generator 196 builds up fairly slowly, thereby preventing damage to either the motor or the generator.

The mechanical connections for operating the electric motor control above described, and for operating the quick traverse clutch 98, as best shown in Figs. 5 to 13 inclusive and Figs. 19 to 23 inclusive, comprise a single manually operable control lever 250 which is movable lengthwise of the table travel from a vertical neutral position in either direction to operate the table in either direction at a slow feeding rate, and is movable forwardly away from the machine in either operating position to shift the control mechanism from the slow feed to a corresponding quick traverse position. The control lever 250 is mounted on a pivot pin 252 rigidly secured in a housing 254 formed on the end of a cylindrical member 256 which is journaled to turn about a horizontal axis in a bearing 258 in the machine frame. A downwardly projecting tooth 260 on the hub of the control lever 250 engages in a slot 262 in a lengthwise movable shaft 264 journaled to slide within the cylindrical member 256 and keyed to turn therewith by means of a key 266. A pinion 268 formed on the rear end of the cylindrical sleeve member 256 engages with a corresponding rack in a vertically movable control rod 270 which controls the operation of the reversing switch. The switch, as best shown in Figs. 5, 6 and 7, comprises two cross arm contact members 272 which are mounted between two abutting shoulders of a sleeve 274 on the rod 270, and are held yieldingly against their respective shoulders by means of a small compression spring 276 coiled about the sleeve between said switch members. The sleeve 274 is arranged for limited movement with relation to the rod 270 between a shoulder 278 and a flange 280 on the shaft. The switch arms 272 are arranged to engage respectively with the contact members 282 and 284 to close the electrical connections for driving the motor in opposite directions as above described. When the manual control lever 250 is moved to the right from its vertical neutral position, the corresponding rotation of the sleeve member 256 causes the control rod 270 to be depressed from the neutral position shown in Fig. 7 engaging the shoulder 278 with the sleeve 274 to correspondingly depress the sleeve 274 and engage the lower switch arm 272 with the corresponding contacts on the member 284 to drive the table to the right. Rotation of the sleeve member 256 in an opposite direction causes the control rod 270 to be elevated, engaging the flange 280 with the sleeve 274 to disengage the switch, and with the continued rotation of the sleeve 256 to engage the upper switch arm 272 with the corresponding contacts on the member 282 to drive the table to the left. In order to prevent a too rapid reversal of the switch, and to allow a sufficient amount of time for the operation of the braking and reversing relays of the electrical mechanism, a dash-pot is provided comprising a piston 286 which is secured to the lower end of the control rod 270 and arranged to slide in a dash-pot cylinder 288.

The mechanical connections for controlling the position of the quick traverse clutch and the conditions of the electrical motor control to drive the table at a quick traverse rate in either direction, comprise a horizontal rock shaft 290 located directly beneath and at right angles to the shaft 264, and on which a sleeve clutch member 292 is mounted to turn freely. A lengthwise movement of the shaft 264 is arranged to cause a corresponding rotational movement of the sleeve clutch member 292 through connections comprising gear teeth 294 formed on the member 292 which are arranged to engage in corresponding peripheral grooves 296 formed in a sleeve 297 fixed on the shaft 264. Secured to the shaft 290 adjacent the clutch member 292 is a clutch sleeve 298 having on one end thereof clutch teeth 300 which are maintained permanently in mesh with corresponding clutch teeth 302 on the adjacent face of the clutch sleeve 292. These teeth are so arranged as to permit a considerable amount of lost motion between the sleeve member 292 and sleeve 298. The sleeve 298 is provided with a downwardly extending arm 304 which is connected by a link 306 to one arm of the bell-crank clutch shifting lever 100 above described for shifting the shaft 60 endwise to engage alternatively the slow feed and quick traverse drives. The sleeve 298 is also provided with a laterally extending arm 318 for controlling the operation of a high speed motor switch. This arm engages with the upper end of a pin 320 which is slidably mounted in the machine frame, and at its lower end engages with a spring-pressed plunger 322 journalled in a bracket 324 and normally held in a raised position by a compression spring 326 coiled about the plunger between the bracket and a collar 328. At its lower end the plunger carries the circuit closing arm 230 for the motor high speed switch which is held yieldingly in a limiting position against a collar 331 on the plunger by a spring 332, and is arranged upon the upward movement of the pin 320 and plunger 322 to cooperate with contacts on the bracket 324 to close the switch.

The sleeve member 298 and shaft 290 secured to turn therewith, are normally held in the position shown in Fig. 5, with the shaft 60 held at the extreme left (see Fig. 3) in slow feed position against the pressure of spring 108, and with the lever arm 318 and the intervening connections above described depressed against the pressure of the spring 322 to hold the quick traverse switch in its open position, by means of a latch 334 pivoted at 336 on the machine frame, and adapted to engage with a notch 338 formed in the sleeve 298. A tension spring 340 connected at one end to the latch 334, and at its other end to the machine frame, tends to maintain the latch in engaging position in contact with the notch 336. There is also formed on the latch 334 an upwardly extending V-shaped projection 342 which is arranged in the path of two cam surfaces 344 formed on the under side of the sleeve member 297 rigidly secured to the shaft 264. These cam surfaces 344 are arranged to engage with the projection 342 to trip the latch 334 upon endwise movement of the shaft 264 and sleeve 297 to quick traverse position only for the two angular positions of the shaft 264 corresponding to the operating positions of the reversing switch 272 to drive the table in either direction. As shown in Figs. 7 and 9, there is also mounted on the shaft 290 the contact arm 346 of a starting and stopping switch for the spindle motor 436 hereinafter more fully to be described. During the normal low speed operation of the table feed when the rock shaft 290 will occupy the angular position shown in Figs. 5 and 9, the contact arm 346 is held in engagement with a corresponding contact 348 to close the switch and maintain the spindle motor 436 in operation.

Starting with the parts in substantially the position shown in Fig. 5, and further assuming a low speed operation of the table in one direction, a movement of the control member 250 to the quick traverse position shown in dotted lines in Fig. 5, will cause the control mechanism described to operate as follows: The shaft 264 will be moved to the right as viewed in Fig. 5, causing the sleeve clutch 292 to be rotated. The continued axial movement of the shaft causes one of the cam surfaces 344 to engage with the V-shaped projection 342 of the latch 334 to trip the latch and permit the rotation of the shaft 290 and sleeve 298 under the pressure of the clutch spring 108 and the high speed motor switch spring 326 disengaging the spindle motor switch 345 and simultaneously causing the shaft 60 to be shifted to the right to engage the quick traverse clutch members 96 and 98, and causing the plunger 322 to be raised to close the high speed motor switch. When it is desired to return the table to a slow speed feeding rate, the shaft 264 is again moved to the left as viewed in Fig. 5, causing the sleeve clutch member 292 to be rotated in a reverse or counterclockwise direction, as shown in Figs. 5 and 11 engaging the clutch member 302 with the corresponding members 300 on the face of the sleeve 298 to return this member to its low speed position, and simultaneously to re-engage the spindle motor switch 346, open the quick traverse clutch and disengage the high speed switch. As the parts are finally returned to the position shown in Figs. 5 and 11, the latch 334 actuated by its spring 340 will drop behind the projection 338 to lock the parts in their low speed position.

In order to provide a more completely automatic operation of the machine, connections are provided for operating these mechanisms to reverse the direction of table drive, and to shift the table drive to a quick traverse position and back automatically at predetermined points in the table travel. The reversal in the direction of drive is accomplished automatically by means of a pair of reversing dogs 350 formed on adjustable brackets 352 and 354 on the side of the table. These dogs are arranged to engage with a roll 356 on a lever arm 358 secured to a rock shaft 360 which is supported in a controller post or housing 361 rigidly secured to the machine base at the front side of the table. The rock shaft 360 also carries an arm 362 provided at its outer end with a gear segment arranged to engage with a rack 364 formed on a vertically movable sleeve control member 366 also housed within the post 361. At its lower end the sleeve control member 366 is provided with a second rack 368 arranged to engage with a corresponding pinion 370 on the sleeve member 297 secured to the shaft 264. It will readily be seen that the upward or downward movement of the sleeve control member 366 upon engagement of one of the dogs 350 with the roll 356 will rotate the shaft 264 and the sleeve member 256 keyed to turn therewith, to operate the reversing switch as above described.

For shifting the control mechanism above described automatically to a quick traverse or slow feed position as required during the continued operation of the table, dogs 372 are formed on the brackets 352 and 354 and on an additional bracket 374 to engage with a roll 376 on a laterally extending arm 378 secured to a rock shaft 380 supported within the post 361. There is also secured to the rock shaft 380 a laterally extending member 382 which is provided at its outer end with a gear segment 384 arranged to mesh with a corresponding rack 386 on a vertically movable shaft 388 journaled within and extending downwardly beyond the end of the sleeve control member 366. The control shaft 388 is connected at its lower end to rotate the sleeve gear member 292 through the engagement of a gear segment 390 on the member with a corresponding rack 392 formed on the control shaft 388.

With this arrangement of the parts it will readily be seen that the vertical movement of the control shaft 388 under the influence of the dogs 372 will operate in shifting the controls from a slow speed to a quick traverse position to rotate the sleeve clutch member 392 in a clockwise direction as viewed in Figs. 5 and 11, and move the shaft 264 axially to the right to trip the latch 334 as above described. Similarly, the movement of the control shaft 388 in an opposite or downwardly direction will rotate the sleeve clutch member 292 in a counterclockwise direction to return the parts to their slow feeding position as above described.

In order to insure a very accurate timing of the reversal of the motor drive, and to insure the accurate positioning of the reversing switch for the motor in its neutral and alternative driving positions, an automatic mechanism is provided for yieldingly moving and maintaining the reversing controls in the desired driving or neutral position. This mechanism comprises a laterally extending cam 394 formed integrally with the sleeve 297 on the rock shaft 264 which is arranged for engagement with a cam roll 396 carried on one arm of a U-shaped lever 398 pivoted at 400 to the machine frame. A heavy tension spring 402 secured at one end to the lever 398, and at its other end to the machine frame, tends to force the cam roll 396 with considerable pressure against the cam 394. With the parts in the low speed position, the roll 396 engages with a V-shaped portion 404 of the cam having its apex hollowed out, so that the shaft 264 will be held yieldingly in one of three definite angular positions corresponding to the neutral and two driving positions of the control mechanism. When, however, the shaft 264 is moved axially to the quick traverse position, the roll 396 will be in engagement with a portion of the cam having a single apex 406, so that the control shaft 264 will be automatically moved across neutral from one to the other driving position. With the control mechanism in its neutral position, the roll 396 engages in the hollowed-out portion of the V-shaped cam surface 404, and by engagement with the side of the cam 406 prevents endwise movement of the shaft 264. The construction of the cam surfaces 404 and 406 in combination with the cam roll 396, therefore, provide a positive lock to prevent the shaft 264 from being moved axially to its quick traverse position until after a rocking movement of the shaft 264 in one direction or the other to connect the table drive for low speed operation, has first taken place.

It is sometimes desired to change the rate of feed for different portions of table travel during continued operation of the machine. With the electrical motor control herein disclosed, this result is obtained by mechanism which is arranged to vary the setting of the potentiometer 228 during the table travel. This mechanism (see Figs. 5 and 8) comprises one or more feed rate dogs 410 adjustably secured to the rear side of the table which are adapted to engage with a roll 412 on a lever arm 414 which is secured to a rock shaft 416. The rock shaft 416 carries a downwardly extending lever arm 418 provided at its lower end with a gear segment 420 arranged to mesh with the corresponding pinion 422 on the potentiometer control shaft 424. For the manual adjustment of the potentiometer, the control shaft 424 is extended through the frame of the machine, and is provided at its outer end with a knurled head 426 and a dial 428 which is scaled to give a direct reading of the feeding rate in terms of inches per minute. The reading will be taken from the one or the other of the two scales on the dial depending upon the relative positions of the two pick-off gears 76 and 77 in the slow traverse feed train above described.

The machine is provided with a rotary milling cutter 430 of ordinary description (see Figs. 1 and 14 to 18 inclusive) supported in the conical shaped supporting bit 432 of the rotary cutter spindle 36. As illustrated in the drawings, the cutter spindle 36 is driven from a separate electric motor 436 mounted in the machine column, through an intervening gear train which comprises a bevel gear 438 secured to turn with the spindle 36, and arranged to engage with a corresponding bevel pinion 440 on a laterally extending shaft 442. This shaft is connected to a parallel drive shaft 444 through two intermeshing pick-off change speed gears 446 and 448. The shaft 444 is in turn driven from the electric motor 436 by means of a gear 450 on the shaft 444 which meshes with a corresponding pinion 452 on the armature shaft 454 of the motor.

Under certain operating conditions, as for instance where the cutter is back fed over a previously milled surface of the work, it is desirable to arrest the rotation of the cutter spindle to prevent marking or scoring of the finished surface, particularly where this idling feed movement takes place at a quick traverse rate. To this end electrical connections are provided including the spindle motor starting and stopping switch previously described which act simultaneously with the shifting of the table feed motor controls to quick traverse position to stop the spindle motor and upon the return of said controls to the slow traverse or feed position to put the spindle motor again in operation. In order to further increase the effectiveness and usefulness of this device, a brake has been provided which acts simultaneously with the disconnecting of the spindle motor starting and stopping switch to bring the spindle to an almost instantaneous stop, and to maintain the spindle in its stopped position until the switch is again closed to start the spindle. With this device, any possibility of scoring of the work due to the over-running of the cutter spindle is eliminated under conditions where the shift from the feeding to the quick traverse rate takes place with the cutter in engagement with the work, as for instance, where the cut is being made against a shoulder, and the table upon reversal is quickly shifted to quick traverse for the return movement.

As best shown in Figs. 14 and 15, the brake comprises a disk member 460 which is rigidly mounted on one end of the armature shaft 454, and has formed thereon an external gear 462 arranged to mesh with a corresponding set of gear teeth formed on the inside periphery of a friction ring 464. The ring 464 is arranged between two relatively stationary friction surfaces comprising a ring 466 rigidly mounted in the frame of the machine and an axially movable friction disk 468 which has formed thereon an external gear 470 arranged to engage with a corresponding fixed internal gear 472 to prevent rotary movement of the disk. It will readily be seen that this construction is adapted to produce an extremely powerful braking action which will act to stop the cutter spindle within a few degrees of rotation without subjecting the armature shaft or bearings to any additional strains which would tend unduly to increase the wear on the parts or to interfere with the efficient operation of the motor.

With the present construction, mechanism is provided which is rendered operative upon the disconnecting of the spindle motor switch to simultaneously move the disk 468 axially to engage the rotating friction disk 460 between the stationary flange 466 and the disk 468 to bring the cutter spindle to an immediate stop. This mechanism comprises a rotatable cam disk 474 which is mounted in an end thrust bearing 476 axially disposed with relation to the motor spindle 454, and supported in a cylindrical support 478 screw-threaded to an end plate 480 of the motor support. The cam disk 474 is provided on its inner face with a series of sloping cam surfaces 482 (see Fig. 16) which are arranged to engage with corresponding surfaces 484 formed on the stationary disk 468, so that a rotational movement of the cam disk 474 in one direction will cause the disk 468 to be moved axially to set the brake. This rotational movement of the cam disk 474 is controlled by means of a rearwardly extending lever arm 486 formed integrally with the disk 474 and connected through a link 488 to the core 490 of a solenoid 492. A tension spring 494 connected at one end to the lever arm 486 and at its other end to a pin 496 on the machine frame, tends to swing the arm 486 in a direction to engage the cam surfaces 482 and 484 to set the brake. The electrical connections from the starting and stopping switch to the spindle motor 436 are so arranged that while the switch is closed, an energizing current is passed through the solenoid 490 and the lever arm 486 connected thereto downwardly against the pressure of the spring 494 to release the brake. The movement of the switch to off position is arranged simultaneously to disconnect the motor and to deenergize the solenoid, so that the lever arm 486 will be moved upwardly under the pressure of the spring 494 to set the brake, and bring the spindle to an immediate stop. In order to secure a close adjustment of this mechanism and to take up for wear on the parts, a manual adjustment is provided to enable the operator conveniently to vary the angular position of the screw-threaded bearing sleeve 478, and thus to move the cam member 474 axially toward or away from the axially movable disk 468. To this end a gear 498 is mounted within the casing on a bearing pin 500 to mesh with a corresponding gear 502 formed on the periphery of the sleeve bearing support 478, and has a portion of its periphery exposed for convenience of manipulation by the operator.

The electrical connections for controlling the operation of the spindle motor 436 and the main driving motor 194 for the table feed are illustrated diagrammatically in Fig. 25. Power is transmitted to the spindle motor 436 from the main three phase power line 506 through the branch power line 508 and switch connections 510. Power is similarly transmitted to the feed driving motor 194 through the branch power line 512, and switch connections 514.

The switch connections 510 and 514 for the spindle and feed motors are controlled respectively by relays 516 and 518 and a control circuit which includes the main starting and stopping switch 520 for the machine, safety devices designed to stop the motors in the event of overloading or overheating, and certain additional switches for separately controlling the operation of the spindle motor 436. The closing of the open contact of the switch 529 serves to complete the circuit through the switch relays 516 and 518 to put the machine in operation. At the same time a no-voltage release relay 522 is energized to close a shunt circuit around the starting contact of the switch 250, which is now released by the operator and permitted to move again to open position. For stopping the machine a second contact member is provided in the switch 250 which acts when opened to break the circuit, de-energizing the switch relays 516 and 518, and the no-voltage release relay 522, thus opening the shunt circuit around the open starting contact of the switch 520 to leave the machine in stop position as the stopping contact of the switch is again permitted to close. There is also included in the control circuit an instantaneous overload relay 524 for the spindle motor and overheating cut-off devices 526 and 528 located respectively in the branch power lines 508 and 512 for the spindle and feed motors. With these connections it will readily be seen that any departure from normal operation conditions in either motor when detected by the safety devices described will result in the immediate stopping of both motors and the avoidance of any possibility of injury to the machine or to the work supported thereon. Particularly in the event that the spindle motor becomes overloaded and in danger of stalling, the overload relay 524 will act to open the control circuit and stop the table feed before injury can result from interference of the advancing work and the cutter.

The automatic switch 346 above described for disconnecting the spindle drive during the operation of the table at quick traverse is illustrated in Fig. 25 in diagrammatic form. There is also provided a manually operated switch 530 which can be operated independently of the automatic switch to connect the spindle motor for continuous operation for both the slow speed and quick traverse operation of the table motor drive when so desired.

A preferred embodiment of the invention having been described, and the nature and scope of the invention having been indicated, what is claimed is:

1. In a machine tool, the combination of a rotary milling cutter, a support therefor, a work support, an electric motor, a transmission train connecting the motor and one of said supports for imparting feeding movement to said support, means for maintaining the motor at a constant speed under varying loads, means for adjusting the motor speed to produce any one of a plurality of predetermined feeding rates of said motor driven support, and an indicator device to indicate the rate of travel of said support corresponding to the setting of said motor speed adjusting means.

2. In a machine tool, the combination of a rotary milling cutter, a support therefor, a work support, an electric motor, connections between the motor and one of said supports for imparting feeding and quick traverse movement to said support, means for maintaining the motor at a constant speed under varying loads, means for adjusting the motor speed to produce any one of a plurality of predetermined feeding rates, a reversing switch for the motor to reverse the direction of feeding movement, a manually operable control member, connections controlled thereby for closing the reversing switch to drive the support alternatively in either direction, and connections controlled by said member for adjusting the motor speed to produce a quick traverse rate of movement of the support.

3. In a machine tool, the combination of a rotary milling cutter, a support therefor, a work support, an electric motor, connections between the motor and one of said supports for imparting feeding and quick traverse movement to said support, means for maintaining the motor at a constant speed under varying loads, means for adjusting the motor speed to produce any one of a plurality of predetermined feeding rates, a device for adjusting the motor speed to a maximum quick traverse rate, a reversing switch for the motor to reverse the direction of support movement, a manually operable member, and connections to each of said adjusting device and reversing switch controlled by the movement of said member to drive the support in either direction alternatively at a feeding rate or a quick traverse rate.

4. In a machine tool, the combination of a tool, a tool support, a work support, an electric motor for moving one of said supports to impart relative feeding movement to the work and the tool, separate transmission trains for driving the support from the motor alternatively at feeding and quick traverse rates, means for varying the motor speed, means for shifting from one transmission to the other, and control means arranged when rendered operative for actuating said transmission shifting and motor control means simultaneously to shift from one transmission train to the other and to effect a predetermined variation in the speed of the motor.

5. In a machine tool, the combination of a tool, a tool support, a work support, an electric motor, transmission trains connecting the motor and one of said supports for driving said support at different speeds for a given speed of the motor, electrical connections adjustable to drive the motor at a plurality of predetermined speeds, and means for shifting from one transmission train to the other, means for effecting an adjustment of said electrical connections, and control means arranged when rendered operative for actuating said transmission shifting and motor adjusting means simultaneously to shift from one of said transmission trains to the other and simultaneously to effect a predetermined adjustment of the motor speed.

6. In a machine tool, the combination of a tool, a tool support, a work support, an electric motor, transmission trains for driving the support from the motor at feeding and quick traverse rates, a reversing switch for the motor to reverse the direction of support movement, a manually operable member, connections controlled by the movement of the member in opposite directions from a central neutral position to close the reversing switch to drive the support alternatively in opposite directions, and connections controlled by the movement of the member in a direction transversely of said reversing positions to shift from one transmission to the other to drive the support alternatively at feeding and quick traverse rates.

7. In a machine tool, the combination of a tool, a tool support, a work support, an electric motor, connections between the motor and one of said supports for imparting feeding and quick traverse movement to said support, a reversing switch for the motor, means for adjusting the motor speed to produce any one of a plurality of predetermined feeding rates, a manually movable control element, connections controlled by the movement of said element in opposite directions from a central neutral position for moving the reversing switch to drive the motor alternatively in opposite directions, and connections controlled by the movement of said element in a direction transversely to adjust the motor speed to produce a maximum quick traverse rate.

8. In a machine tool, the combination of a tool, a tool support, a work support, an electric motor, transmission trains for driving the support from the motor at feeding and quick traverse rates, a reversing switch for the motor, means for adjusting the motor speed to produce any one of a plurality of predetermined feeding rates, a manually movable element, connections controlled by the movement of said element in opposite directions from a central neutral position to close the reversing switch to drive the support alternatively in opposite directions, connections controlled by the movement of said element in a direction transversely of said reversing positions to shift from one transmission to the other, and connections controlled by the movement of said element to said quick traverse position simultaneously to adjust the motor to produce a maximum quick traverse rate.

9. In a machine tool, the combination with a milling cutter, of a support therefor, a work support, an electric motor for moving one of said supports to feed the work with relation to the cutter, a generator supplying current to drive the motor, a generator field, an arc discharge tube for delivering rectified current to the field circuit, the tube having a control element, a phase-shifting circuit associated with the control element, a control circuit for controlling the phase-shifting circuit, a pilot generator driven by the motor and electrically connected in the control circuit, a supplemental arbitrarily variable element in said control circuit to secure a plurality of predetermined rates of travel of said work support, and an indicator device connected to said supplemental means to indicate the rate of travel of said support corresponding to the setting of said supplemental means.

10. In a machine tool, the combination of a tool, a tool support, a work support, an electric motor, a transmission train connecting the motor and one of said supports, means for maintaining the motor at a constant speed under varying loads, electrical connections including a variable speed control element adjustable to drive the motor at a plurality of predetermined feeding rates, means acting when rendered operative to drive the motor at a predetermined speed irrespective of the setting of said variable speed control element, and a separate control element for actuating said means to drive the motor at a single predetermined speed.

11. In a machine tool, the combination of a tool, a tool support, a work support, an electric motor, a transmission train connecting the motor and one of said supports for imparting feeding movement to said support, a generator supplying current to drive the motor, a generator field, means for maintaining the motor at constant speeds under varying loads comprising an arc discharge device for delivering a rectified current to the generator field and means responsive to variations in motor speed for controlling said arc discharge device to vary the field current, means including a variable speed control element for varying the operation of said arc discharge device to vary the current supplied to the generator field adjustable to produce any one of a plurality of predetermined feeding rates, and means including an additional control element arranged to render said variable speed control element inoperative and to control said arc discharge device for a single predetermined feeding rate.

12. In a machine tool, the combination of a tool, a tool support, a work support, an electric motor, transmission trains for driving one of said supports from the motor at feeding and quick traverse rates, a reversing switch for the motor to reverse the direction of feed, electrical connections for varying the speed of the motor to vary the feeding rate, and means for shifting to the quick traverse train and concurrently adjusting the motor speed to produce a maximum quick traverse rate of the support.

13. In a machine tool, the combination of a tool, a tool support, a work support, an electric motor, transmission trains for driving one of said supports from the motor at feeding and quick traverse rates, a clutch movable to connect either train, a reversing switch for the motor to reverse the direction of drive, electrical connections for varying the speed of the motor to vary the feeding rate, a single manually operable member, connections controlled by the movement of said member in either of two predetermined directions from a central neutral position to close the reversing switch to drive the support alternatively in either direction, and connections rendered operative by the movement of said member in a different direction to move the clutch alternatively from a feeding to a quick traverse position and simultaneously to adjust the motor speed to produce a maximum quick traverse rate.

14. In a machine tool, the combination of a tool, a tool support, a work support, an electric motor for moving one of said supports to impart relative feeding movements to the work and the tool, connections including a clutch arranged alternatively for driving the support from said motor at a slow or quick traverse rate, electrical connections adjustable to drive the motor at a plurality of predetermined speeds, and means acting simultaneously when rendered operative to move the clutch from slow to quick traverse position and to effect an adjustment of said electrical connections for a maximum speed of the motor.

15. In a machine tool, the combination of a tool, a tool support, a work support, an electric motor for moving one of said supports to impart relative feeding movements to the work and the tool, connections including a clutch arranged alternatively for driving the support from said motor at a slow or quick traverse rate, electrical connections adjustable to secure a variable speed of the motor to operate the table at a wide range of different speeds, a reversing switch, a high speed switch, and means under the control of the operator for simultaneously moving said clutch to quick traverse position and for closing said high speed switch to operate the work support at a quick traverse rate, and additional means under the control of the operator for operating the reversing switch to reverse the direction of drive of the work support.

16. In a machine tool, the combination of a tool, a tool support, a work support, an electric motor for moving one of said supports to impart relative feeding movements to the work and the tool, electrical connections to secure a variable speed control of the motor to operate the support at a plurality of feeding rates, electrical means controlled by the speed of the motor to maintain the motor speed at a level corresponding to the setting of the variable speed electrical connections, a reversing switch for the motor, means for automatically reversing the motor switch, and automatic control means for varying said feeding rate at predetermined points in the travel of the support in either direction.

17. In a machine tool, the combination of a tool, a tool support, a work support, an electric motor for moving one of said supports to impart feeding movements to the work and the tool, a reversing switch for the motor, electrical connections to secure a variable speed control of the motor to operate said movable support in either direction at a plurality of feeding and quick traverse rates, a control element for adjusting said connections to secure the desired rate of travel of said support, means for maintaining the motor speed constant at the setting of said control element under varying loads, and means controlled automatically by the movement of said support for operating said control element to vary the rate of travel of said support at predetermined points in the travel thereof in either direction.

18. In a machine tool, the combination with a milling cutter, of a support therefor, a work support, an electric motor for driving one of said supports to impart relative feeding movement to the work and cutter, a generator therefor, a field circuit, an arc discharge tube for delivering rectified current to the field circuit, the tube having a control element, a phase shifting circuit associated with the control element, a control circuit responsive to variations in motor speed for controlling the phase of currents in the phase shifting circuit to maintain a constant motor speed regardless of variations in load, a supplemental arbitrarily variable element in said control circuit, and means controlled by the support movement for acting on said element to produce predetermined variations in the feeding rate at predetermined points in the travel of the support.

19. In a machine tool, the combination with a milling cutter of a work support, an electric motor for driving said support to impart relative feeding movement to the work and cutter, a generator for supplying energy to the motor, a generator field circuit, a rectifier for delivering current to the field circuit, a control circuit including a pilot generator driven by the motor, means responsive to variations in pilot generator voltage to vary the field current supplied through the rectifier to maintain a constant motor speed regardless of varying load, a supplemental control element in said circuit to produce predetermined variations in motor speed, a reversing switch for the motor, means controlled by said switch for reversing the generator field current and for simultaneously reversing the pilot generator connections, and means controlled by the table movement for acting on said element to produce predetermined variations in the table feeding rate in either direction.

20. In a machine tool, the combination of a milling cutter, a support therefor, a movable work support, an electric motor, a neutral and reversing switch for the motor, transmission trains for driving one of said supports from the motor at feeding and quick traverse rates, a control element, connections rendered operative by the rotation of said element to operate said neutral and reversing switch, connections operated by an axial movement of said element to drive the support alternatively through a feeding or quick traverse train, a single manual control member for imparting both rotary and axial movements to said control element, and means actuated automatically by the movement of the support for imparting the required rotational and axial movements to said control element to automatically control the operation of the support.

21. In a machine tool, the combination of a milling cutter, a support therefor, a work support, an electric motor for driving one of said supports to feed the work with relation to the cutter, a neutral and reversing switch for the motor, connections for driving said support from the motor at a plurality of feeding and quick traverse rates, a control element, connections rendered operative by the rotation of said element to operate said neutral and reversing switch, connections operated by an axial movement of said element to drive the table alternately at a feeding and quick traverse rate, a detent mechanism comprising a yieldingly actuated detent member and cooperating cam members engaged thereby for controlling the angular position of said control element arranged in the axial low speed position of said control element to engage said element alternately in each of said driving and neutral positions, and arranged in the quick traverse position of said element to engage said element only in alternate driving positions.

22. In a machine tool, the combination of a milling cutter, a support therefor, a work support, an electric motor for driving said support to feed the work with relation to the cutter, a neutral and reversing switch for the motor, connections for driving said support from the motor at a plurality of feeding and quick traverse rates, a control element, connections rendered operative by the rotation of said element to operate said neutral and reversing switch, connections operated by an axial movement of said element to drive the table alternately at a feeding and quick traverse rate, a detent mechanism comprising a yieldingly actuated detent member and cooperating cam members engaged thereby for controlling the angular position of said control element arranged in the axial low speed position of said control element to engage said element alternately in each of said driving and neutral positions, and arranged in the quick traverse position of said element to engage said element only in alternate driving positions, and further arranged in the neutral low speed position of said element to lock said element against axial movement to high speed position.

23. In a machine tool, the combination of a milling cutter, a support therefor, a work support, an electric motor, transmission trains for driving one of said supports from the motor at feeding and quick traverse rates, a reversing switch for the motor, clutch mechanism operable to connect said trains to drive the support alternatively at feed and quick traverse rates, spring means tending to hold said clutch in quick traverse position, a latch mechanism for maintaining the clutch in feeding position against the pressure of said spring, and a control element acting when moved in one direction to trip the latch to engage the clutch for quick traverse operation and acting when moved in an opposite direction to engage the clutch for feed operation, and simultaneously to reset the latch.

24. In a machine tool, the combination of a milling cutter, a support therefor, a work support, an electric motor for moving one of said supports to feed the work with relation to the cutter, electrical connections for varying the speed of the motor, a reversing switch for the motor, a quick traverse switch for operating the motor at maximum speed, driving connections from the motor to the table including a feed and quick traverse clutch, spring means acting on said clutch and quick traverse switch tending to set said elements for quick traverse operation, a latch mechanism acting normally to maintain said clutch in slow speed position and to hold said quick traverse switch open, and a control member movable in one direction to disengage said latch to permit the simultaneous engagement of the clutch and the switch for quick traverse operation, and movable in an opposite direction to disengage the quick traverse clutch and switch and reset the latch.

25. In a machine tool, the combination of a milling cutter, a support therefor, a work support, an electric motor for moving one of said supports to feed the work with relation to the cutter, a neutral and reversing switch for the motor, connections for driving the said support from the motor including a slow feed and quick traverse clutch, spring means acting on said clutch tending to set said clutch for quick traverse operation, an axially and rotatably movable control element, connections rendered operative by the rotation of said element to operate said neutral and said reversing switch, and mechanism rendered operative by the axial movement of the control element to shift the clutch to quick traverse position comprising a latch acting normally to maintain said clutch in low speed position and having formed thereon a surface arranged for engagement with corresponding surfaces on said element to trip the latch upon axial movement of said element only in a position corresponding to an operating position of said reversing switch.

26. In a machine tool, the combination of a tool, a tool support, a work support, an electric motor for moving one of said supports to impart relative feeding movement to the work and the tool, a transmission train for driving the support from the motor, a reversing switch for the motor to reverse the direction of feed comprising a movable switch element having neutral and alternative driving positions, means rendered operative upon opening the switch to stop the motor, and means for retarding the movement of said switch element from one driving position to the other to introduce a substantial delay in the movement of the switch to reversing position.

27. In a machine tool, the combination of a tool, a tool support, a work support, an electric motor for driving one of said supports to impart relative feeding movement to the work and the tool, a transmission train for driving the support from the motor, a reversing switch for the motor to reverse the direction of feed comprising a movable switch element having neutral and alternative driving positions, electrical connections rendered operative by the opening of the switch to apply a dynamic braking moment to the motor, and means for retarding the movement of said switch element from one driving position to the other to introduce a delay in the operation of the switch.

28. In a machine tool, the combination of a tool, a tool support, a work support, an electric motor for driving one of said supports to impart relative feeding movement to the work and the tool, a transmission train for driving the support from the motor, a reversing switch for the motor to reverse the direction of feed, electrical connections rendered operative by the opening of the switch to apply a dynamic braking moment to the motor, and a dash-pot connected to said switch for retarding the movement of the switch from one driving position to the other to introduce a delay in the operation of the switch.

29. In a machine tool, the combination of a tool, a tool support, a work support, an electric motor for driving one of said supports to impart relative feeding movement to the work and the tool, a transmission train for driving the support from the motor, a reversing switch for the motor to reverse the direction of feed of said support, electrical connections rendered operative by the opening of the switch to apply a dynamic braking moment to the motor, means acting automatically when rendered operative to reverse the switch, and a dash-pot connected to the switch to retard the movement of the switch from one driving position to the other.

30. In a machine tool, the combination of a tool, a tool support, a work support, an electric motor for driving one of said supports to impart relative feeding movement to the work and the tool, a generator for supplying energy to the motor, a generator field, a rectifier for delivering current to the generator field, a pilot generator driven by the motor, means responsive to variations in pilot generator voltage to vary the field current supplied by the rectifier to maintain a constant motor speed under varying loads, a reversing switch for the motor, connections operated by said switch to reverse the generator field current and for simultaneously reversing the pilot generator connections, connections rendered operative by the opening of the switch to supply a dynamic braking moment to the motor, and means for retarding the movement of the switch from one driving position to the other.

31. In a machine tool, the combination of a rotary tool supporting spindle, a movable work support for moving the work with relation to the spindle, driving means for the work support including a clutch arranged to drive the work support alternatively at a slow and quick traverse rate, a control element for said clutch having slow feed and quick traverse positions, an electric motor for rotating the spindle, a starting and stopping switch for the motor, and a connection between said control element and switch arranged for the slow feed position of said element to engage the switch and for the quick traverse position of said element to disengage the switch.

32. In a machine tool, the combination of a rotary tool supporting spindle, a movable work support for moving the work with relation to the spindle, driving means for the work support including a clutch arranged to drive the work support alternatively at a slow and at a quick traverse rate, an electric motor for rotating the spindle, a starting and stopping switch for the motor, means acting simultaneously when rendered operative to move the clutch to quick traverse position and to actuate the switch to stop the rotation of the spindle, and a manually operable switch to cut out said starting and stopping switch to maintain operation of the spindle motor during quick traverse.

33. In a machine tool, the combination of a rotary tool supporting spindle, a movable work support for moving the work with relation to the spindle, driving means for the work support arranged to drive the work support alternatively at a slow and a quick traverse rate, an electric motor for rotating the spindle, a starting and stopping switch for the motor, a mechanical brake for stopping the rotation of the spindle, electrical connections including a starting and stopping switch acting simultaneously when rendered operative to shut off the current to the motor and apply the brake, and control devices acting simultaneously when rendered operative to move the work support at a quick traverse rate and to disconnect the switch.

34. In a machine tool, the combination of a rotary tool supporting spindle, a movable work support for moving the work with relation to the spindle, a power drive for the work support arranged to drive the work support alternatively at a slow and at a quick traverse rate, a control element for effecting an adjustment of said power drive to drive the table alternatively at said slow or quick traverse rates, an electric motor for rotating the spindle, a stopping and starting switch for the motor, and connections actuated by the movement of said control element to quick traverse position to open said switch, and upon movement of said element to slow feed position to close the switch.

35. In a machine tool, the combination of a rotary tool supporting spindle, a movable work support for moving the work with relation to the spindle, a power drive for the work support arranged to drive the work support alternatively at a slow and at a quick traverse rate, an electric motor for rotating the spindle, a stopping and starting switch for the motor, means for controlling said drive to operate the table at a quick traverse rate and simultaneously to open the switch, and alternatively to operate the table at a slow feed rate and simultaneously to close the switch, and a manually operable switch for short-circuiting said starting and stopping switch to provide a continuous drive for the spindle.

36. In a machine tool, the combination of a rotary milling cutter, a support therefor, a work support, an electric motor, a transmission train connecting the motor and one of said supports for imparting feeding movement to said support, means for maintaining the motor at a constant speed under varying loads, means for adjusting the motor speed to produce any one of a plurality of predetermined feeding rates, a reversing switch for the motor to reverse the direction of feeding movement, and devices controlled automatically by the movement of the support to operate respectively said switch and said means for adjusting the speed of the motor at predetermined points in the travel of said movable support.

37. In a machine tool, the combination of a tool, a movable work support, an electric motor, driving connections including slow feed and quick traverse clutch elements for driving the support from said motor, means for maintaining the motor at a constant speed under varying loads, means for adjusting the motor speed to produce any one of a plurality of predetermined feeding rates, a reversing switch for the motor to reverse the direction of feeding movement, and devices controlled automatically by the movement of the support to operate each of said switch, said slow feed and quick traverse clutch, and said means for adjusting the speed of the motor at predetermined points in the travel of said support.

38. In a machine tool, the combination of a tool, a tool support, a work support, an electric motor, transmission trains connecting the motor and one of said supports for driving said support at different speeds for a given speed of the motor, electrical connections adjustable to drive the motor at a plurality of predetermined speeds, and devices controlled automatically by the movement of said support at predetermined points in the travel of said support to shift the drive from one to another of said trains and simultaneously to adjust said electrical connections to effect a change in the motor speed.

39. In a machine tool, the combination of a tool, a tool support, a work support, an electric motor, driving connections for driving one of said supports from the motor including slow feed and quick traverse clutch elements, means for adjusting the motor speed to produce any one of a plurality of predetermined feeding rates, and devices controlled automatically by the movement of the support at predetermined points in the travel of said support to shift said clutch elements to quick traverse position and concurrently to adjust the motor to a maximum speed.

40. In a milling machine, the combination with a tool, of a support therefor, a work support, an electric motor for driving one of said supports to impart relative feeding movement to the work and tool, a generator supplying current to drive the motor, an arc discharge device for delivering a rectified current to the generator field, means responsive to variations in motor speed for controlling said device to vary the field current, supplemental arbitrarily adjustable means for controlling said device to vary the field current to secure a plurality of predetermined rates of travel of said work support, a reversing switch for the motor, and devices controlled automatically by the movement of the support to operate respectively said reversing switch and said rectifier control means at predetermined points in the travel of said support in each direction.

IRVING O. MINER.
ARTHUR F. BENNETT.